United States Patent
Dang et al.

(10) Patent No.: US 10,964,925 B2
(45) Date of Patent: Mar. 30, 2021

(54) HERMETIAL VIA SEAL FOR THIN FILM BATTERY

(71) Applicants: International Business Machines Corporation, Armonk, NY (US); FRONT EDGE TECHNOLOGY, INC., Baldwin Park, CA (US)

(72) Inventors: Bing Dang, Chappaqua, NY (US); Qianwen Chen, Yorktown Heights, NY (US); Yu Luo, Hopewell Junction, NY (US); John Knickerbocker, Orange, NY (US); Jae-Woong Nah, Closter, NJ (US); Kai Liu, Baldwin Park, CA (US); Po-wen Cheng, Baldwin Park, CA (US); Tung-hsiu Shih, Baldwin Park, CA (US); Mengnian Niu, Baldwin Park, CA (US); Kai-wei Nieh, Baldwin Park, CA (US)

(73) Assignees: International Business Machines Corporation, Armonk, NY (US); Front Edge Technology, Inc, Baldwin Park, CA (US)

( * ) Notice: Subject to any disclaimer, the term of this patent is extended or adjusted under 35 U.S.C. 154(b) by 152 days.

(21) Appl. No.: 16/283,654

(22) Filed: Feb. 22, 2019

(65) Prior Publication Data
US 2020/0274113 A1   Aug. 27, 2020

(51) Int. Cl.
*H01M 2/06* (2006.01)
*H01M 2/30* (2006.01)
*H01M 10/0585* (2010.01)
*H01M 10/052* (2010.01)

(52) U.S. Cl.
CPC ............... *H01M 2/06* (2013.01); *H01M 2/30* (2013.01); *H01M 10/052* (2013.01); *H01M 10/0585* (2013.01)

(58) Field of Classification Search
CPC .................................. H01M 2/06; H01M 2/30
See application file for complete search history.

(56) References Cited

U.S. PATENT DOCUMENTS

| | | | |
|---|---|---|---|
| 3,262,818 A * | 7/1966 | Di Pasquale | H01M 2/06 429/184 |
| 8,999,571 B2 | 4/2015 | Chiang et al. | |
| 9,648,740 B2 | 5/2017 | Wolf et al. | |
| 2012/0017988 A1 | 1/2012 | Moslehi | |
| 2015/0140415 A1* | 5/2015 | Harayama | H01M 2/30 429/179 |
| 2015/0314129 A1 | 11/2015 | Perraud et al. | |
| 2016/0049618 A1* | 2/2016 | Lee | H01M 2/0202 429/179 |
| 2016/0190668 A1* | 6/2016 | Satou | H01M 2/024 429/403 |
| 2019/0189995 A1* | 6/2019 | Nemoto | H01M 2/0473 |
| 2019/0237728 A1* | 8/2019 | Wakimoto | H01M 2/04 |

* cited by examiner

*Primary Examiner* — Matthew J Merkling
(74) *Attorney, Agent, or Firm* — Daniel P. Morris; Lou Percello, Attorney, PLLC

(57) ABSTRACT

Vertical via connections to a battery are hermetically sealed to prevent environmental factors (e.g. moisture, oxygen, and nitrogen) from entering the internals of the battery through porous conductive material filling the vias resulting in reduced battery performance and battery failure.

17 Claims, 10 Drawing Sheets

HERMETIAL VIA SEAL FOR THIN FILM BATTERY

BACKGROUND

The present invention relates to sealing battery enclosures to prevent leakage and penetration of environmental factors into the battery interior. More specifically, the invention relates to improved sealing of via connections to micro-batteries.

Breaches of the integrity of packaging and other enclosures around batteries, especially lithium batteries, can deteriorate and/or destroy battery operability, energy density, recharge cycles, recharge lifetime, maximum current, performance, shelf life, useable lifetime and reliability. For example, lithium batteries contain highly reactive lithium metal ions and compounds which can react with air (primarily nitrogen, near 80%, and oxygen, near 20%) and moisture that can enter the battery interior through cracks, penetrations, and/or other openings or entry points in the battery containment or packaging.

To complicate the problem, batteries typically require electrical connections or penetrations through the containment or packaging to the outside world. As an example, typical electronic metal interconnects, e.g. made from copper, silver, nickel or other electrical conductors, can be prone to oxidation and corrosion and/or mechanical and/or thermal mechanical stress that over time cause openings through which environmental factors like air and moisture can enter the battery interior and cause damage.

If the battery is integrated into larger circuitry there may be electrical via connections to the battery that connect to other parts of the circuit. Often, batteries may be fabricated with thick film processes using paste to fill vias followed by a sintering process to provide the electrical connection from the battery (cathode and anode battery connections) using via connections to other electronics. Sintering typically removes any paste organics from the paste by heat and volatilization and the metal or metal/composite composition bonds to the exterior seal of the battery or dielectric. Often the via is not sealed but has gaps or voids that may permit penetration of air or moisture to the interior of the battery and limit the battery shelf life, performance or lead to corrosion and reliability issues due to the via leakage. Many of the paste formed vias or alternate via structures typically have some level of porosity, continuous porosity, edge gaps or alternate defects to some degree and do permit environmental factors to penetrate into the battery interior.

Environmental factors entering the battery is problematic even for batteries that are low cost or made in small form factor. Lower cost or small form factor batteries need to have a higher quality and performance because the electronics associated with the battery application become non-functional due to the battery quality and limited battery lifetime.

Use of conventional thin film battery designs and micro-batteries compound the leakage problem. Some thin film batteries like the "Enerchip™" made by the Cymbet Corporation use multiple lateral interconnections which provide multiple points of potential penetration into a small 4 mm×5 mm×0.9 mm DFN (dual-flat no-leads) SMT (Surface-mount technology) package. The side entry design for connections to this battery require a larger footprint for the battery.

Via connections through the top and/or bottom of the battery can reduce the size of the battery footprint over that of side connected battery designs. However, these vias often provide leakage pathways into the battery interior because metallic material within these vias tends to be porous or have gaps that permit air (oxygen and nitrogen gas) and moisture to permeate to the interior of the battery and impact the battery function and/or reliability.

There is a need for a more reliable and effective seal to protect batteries from external factors and particularly to seal against air and moisture penetrations through the battery enclosures/packaging in smaller and/or thin film batteries. There is a need to seal or prevent the battery interior materials leaving the battery enclosures/packaging and going into the environment or into the system electronics. This leakage can affect the use of the battery in an undesired way (e.g. contamination, environmental risk, body or animal use compatibility risk, etc.)

There is also a need to provide sealable connections to microbatteries that enable reduction in the overall footprint of the microbattery in size, form factor, energy density or other limiting battery use applications.

SUMMARY

A preferred embodiment of the present invention is a sealed via connection to a battery; a battery with a sealed, vertical/perpendicular via connection; and more specifically a lithium micro-battery with one or more sealed vertical via connections. Several methods of making batteries with sealed vertical via connections are disclosed.

A substrate has a battery side and an external side where the external side has a substrate surface. One or more vias pass through the substrate. The vias are filled with a porous electrically conductive material. The porous electrically conductive material in the vias has an external via opening on the external side of the battery/substrate and a battery via opening on the internal battery side of the substrate. The battery via opening of one or more of the vias electrically connects to one or more battery components, e.g., a cathode, an anode, and/or associated current collector layers. An electrically conductive seed layer covers the external via opening and penetrates the external via opening a seed layer depth. An electrically conductive cap electrically connects to the seed layer. The seed layer provides adhesion and an interface on the external via opening and on the substrate surface around the via opening and in combination with the conductive cap hermetically seals the porous electrically conductive material from environmental factors. In alternative embodiments, the seed layer and/or cap overlap the substrate surface surrounding the external via opening.

BRIEF DESCRIPTION OF THE DRAWINGS

FIG. 7AM is a micrograph of the via in FIG. 7A.

FIG. 7BM is a micrograph of the via in FIG. 7B.

FIG. 7CM is a micrograph of the via in FIG. 7C.

FIG. 8AM is a micrograph of the cap in FIG. 8A.

FIG. 8BM is a micrograph of the cap in FIG. 8B.

DETAILED DESCRIPTION

Exemplary embodiments of the invention will now be discussed in further detail regarding semiconductor devices/batteries, structures, and methods of manufacturing and using these battery devices and structures.

It is to be understood that embodiments of the invention are not limited to these illustrative structures, methods, apparatus, systems and devices but due to lower costs, mass volume manufacturing compatible methods and the like are instead more broadly applicable to other alternative and broader methods, apparatus, systems micro-systems, sensors, integrated electronics, integrated opto-electronics, sealed packaging micro-systems and devices that become evident to those skilled in the art given this disclosure.

In addition, it is to be understood that the various layers and/or regions shown in the accompanying drawings are not drawn to scale, and that one or more layers and/or regions of a type commonly used in, for example, in one embodiment of a battery and/or other semiconductor device may not be explicitly shown in a given drawing. This does not imply that the layers and/or regions not explicitly shown are omitted from the actual devices.

The devices, structures, and methods for forming these devices and structures in accordance with embodiments of the present invention can be employed in applications, hardware, and/or electronic systems. Suitable hardware and systems for implementing embodiments of the invention may include, but are not limited to, personal computers, communication networks, electronic commerce systems, portable communications devices (e.g., cell and smart phones), solid-state media storage devices, expert and artificial intelligence systems, functional circuitry, the Internet of Things (IoT,) sensors, diagnostics, health monitors, wearable electronics, implantable electronics, etc. Systems and hardware incorporating the semiconductor devices are contemplated embodiments of the invention.

As used herein, "height" refers to a vertical size of an element (e.g., a layer, trench, hole, opening, etc.) in the cross-sectional or elevation views measured from a bottom surface to a top surface of the element, and/or measured with respect to a surface on which the element is located.

Conversely, a "depth" refers to a vertical size of an element (e.g., a layer, trench, hole, opening, etc.) in the cross-sectional or elevation views measured from a top surface to a bottom surface of the element. Terms such as "thick", "thickness", "thin" or derivatives thereof may be used in place of "height" where indicated.

As used herein, "lateral," "lateral side," and "lateral surface" refer to a side surface of an element (e.g., a layer, opening, etc.), such as a left or right-side surface in the drawings.

As used herein, "width" or "length" refers to a size of an element (e.g., a layer, trench, hole, opening, etc.) in the drawings measured from a side surface to an opposite surface of the element. Terms such as "thick", "thickness", "thin" or derivatives thereof may be used in place of "width" or "length" where indicated.

As used herein, terms such as "upper", "lower", "right", "left", "vertical", "horizontal", "top", "bottom", and derivatives thereof shall relate to the disclosed structures and methods, as oriented in the drawing figures. For example, as used herein, "vertical" refers to a direction perpendicular to the top surface of the substrate in the elevation views, and "horizontal" refers to a direction parallel to the top surface of the substrate in the elevation views.

As used herein, unless otherwise specified, terms such as "on", "overlying", "atop", "on top", "positioned on" or "positioned atop" mean that a first element is present on a second element, wherein intervening elements may be present between the first element and the second element. As used herein, unless otherwise specified, the term "directly" used in connection with the terms "on", "overlying", "atop", "on top", "positioned on" or "positioned atop," "disposed on," or the terms "in contact" or "direct contact" means that a first element and a second element are connected without any intervening elements, such as, for example, intermediary conducting, insulating or semiconductor layers, present between the first element and the second element.

It is understood that these terms might be affected by the orientation of the device described. For example, while the meaning of these descriptions might change if the device was rotated upside down, the descriptions remain valid because they describe relative relationships between features of the invention.

In addition, certain elements or reference numbers may be left out of particular views for the sake of clarity and/or simplicity when explanations are not necessarily focused on such omitted elements. Moreover, the same or similar reference numbers used throughout the drawings are used to denote the same or similar features, elements, or structures, and thus, a detailed explanation of the same or similar features, elements, or structures will not be repeated for each of the drawings unless there is a change or alternative feature to be presented in a particular figure.

Micro-batteries can have a thin ceramic substrate on which they are deposited. The use of via connections can reduce the footprint of devices, like small batteries. In some embodiments the substrate is first drilled with via, then the via is filled with a metallic material, e.g. an Ag-paste, for electrical connection. After high-temperature sintering and/or annealing, the organic components in the Ag-paste are burned out and Ag flakes or Ag particles are sintered, annealed and/or UV cured. As a result, a significant amount of porosity is present after annealing the metal material in the via. In some preferred embodiments, electroless Ni plating can fill the pores within the annealed Ag via, cap the Ag via and/or provide a more planar cap or surface topography for the via. In other embodiments, metal deposition of a seed layer can ensure that the interface between and/or outside the Ag and thin substrate is also covered in order to create a hermetic sealed or near hermitic seal connection. More detail and alternative embodiments are disclosed below.

Figure 1A:
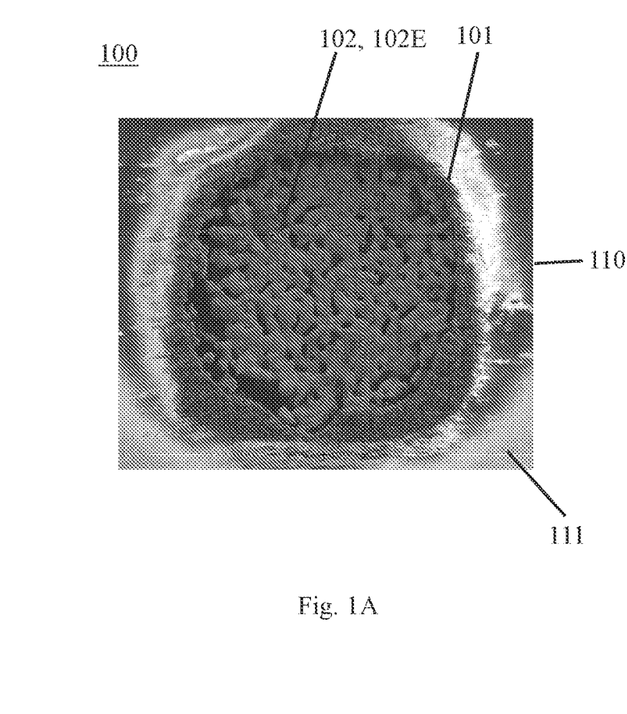
FIG. 1A is a micrograph image of a via structure filled with a conductive material with the surface of the substrate around the via opening and/or the upper via walls prepared for application of a seal and/or a plug or cap.

Referencing FIG. 1A which is a micrograph image of a via structure 100 filled with a porous conductive material 102 with the surface 111 of the substrate 110 around the via opening 101 and/or the upper via walls prepared for application of a seal 125 and/or a plug or cap 260.

Figure 1B:
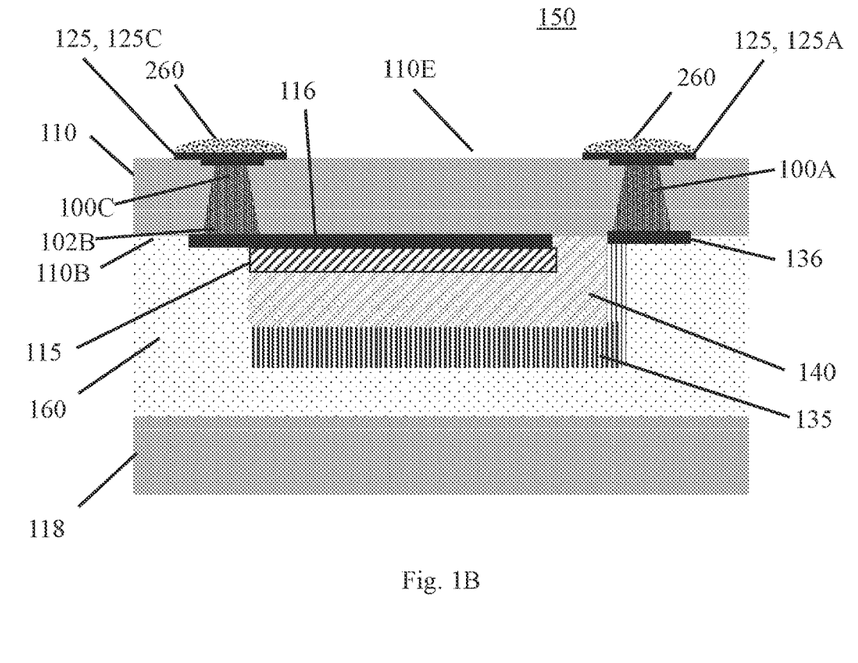
FIG. 1B is a block diagram of an example battery with two vias with novel seals.

FIG. 1B is a block diagram of an example battery 150 with two vias (100C, 100A), typically 100, with novel seals, typically 125, and a plug and/or a cap 260. More specifically, in this embodiment 150, a first via 100C is electrically and mechanically connected to a cathode 115, e.g. a lithium containing cathode 115, though a cathode current carrying distribution layer 116, current collector 116, or cathode electrode 116. A second via 100A is electrically and mechanically connected to an anode 135 through an anode current carrying distribution layer 136, anode electrode 136, or current collector 136.

The vias (100A, 100C) pass through a substrate 110. The substrate 110 has an external side 110E and a battery side 110B. In preferred embodiments, the porous conductive material 102 in the via 100 connects to the battery internals (e.g. cathode 115, cathode current carrying distribution layer or cathode current collection layer 116, anode 135, anode current carry distribution layer or anode current collection layer 136, and electrolyte) on the battery side 110B of the substrate 110. In preferred embodiments, the external connections to the caps 260 through the seed layers 125 to the porous material 102 in the vias 100 are made on the external side 110E of the substrate 110.

The conductive material 102 filling the via 100 is exposed at an external via opening 102E when opening to the external side 110E of the substrate. The conductive material 102 filling the via 100 is exposed at a battery via opening 102B when opening to the battery side 110B of the substrate 110. The external via opening 102E and the battery via opening 102B are on opposite ends of the via 100.

In preferred embodiments, the vias (100A, 100C) have a seal 125 and a cap or plug 260. The seal 125 prevents environmental factors from entering the battery 150. The cap 260 may provide some environmental protection and also provides a physical and electrical contact from the batter 150 to external connections.

In preferred embodiments, the seals, generally 125, have a width or average diameter of between 10 to 50 microns and/or between 2 to 5 times the diameter of the via 100.

Figure 8:
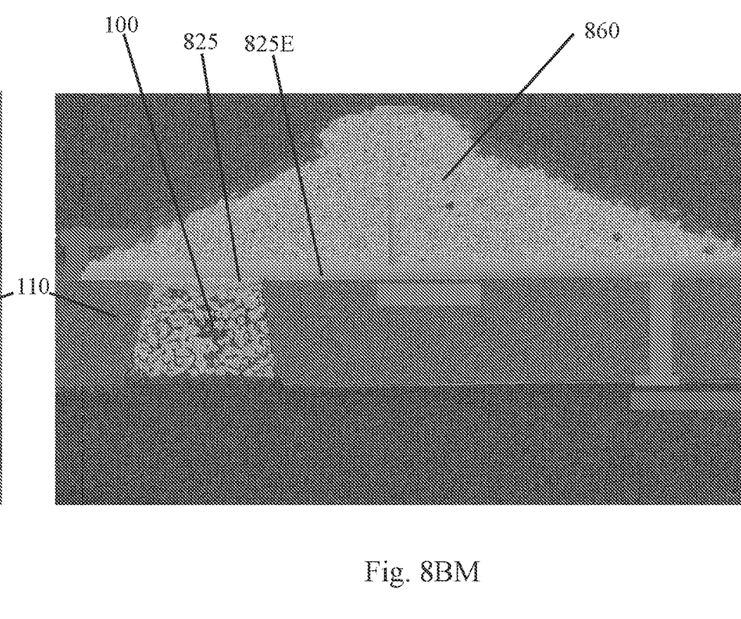

In preferred embodiments, the seals 125 extend over and past the edges 101 of the via 100 and may continue past the via edges peripherally by 50% to 3 times the diameter of the via 100 or more. This "overlay" (see 825L in FIG. 8AM) increases the area of contact the seals 125 have with the top of the substrate 111 to create more sealed area around the top edge 101 of the via 100 to prevent entrance of exterior environmental factors into the battery 150.

In an alternative embodiment, the metal material 102 within the via 100 is recessed and the seal 125 will cover the top of the metal material 102 and peripherally extend up the via wall to increase the area of contact between the seal 125 and the via wall.

In preferred embodiments, the seals 125 are made of one or more of the following ways: implanting a seed layer on the metal material 102 filling the via 100 and on the substrate surface surrounding the via and plating one or more thin or thick layers of conductive material on the seed layer and/or substrate surface surrounding the via.

In preferred embodiments, the seals 125 are deposited by any one or more of the following vacuum deposition methods: sputtering, atomic layer deposition (ALD), evaporation, Chemical Vapor Deposition (CVD,) Plasma Enhanced Chemical Vapor Deposition (PECVD,) Physical Vapor Deposition (PVD) or alternate deposition method and may use shadow mask deposition control techniques or other dry, wet or dry and wet methods of lithography to control location of depositions as discussed below.

In preferred embodiments, the seals 125 are about 10 µm in thickness and may be tapered at the cap perimeter. In other preferred embodiments, the seals 125 can be between about 1 to over 20 microns in thickness and should be deposited without penetrating defects above the via to avoid undesired gas or chemical permeation paths in or out of the battery. The seals 125 can also be deposited on the substrate 110 surface 111 surrounding the via 100.

In preferred embodiments of the battery 150, there is a second encasement layer or substrate 118 to provide containment, structural support, and electrical insulation. In preferred embodiments, the substrates (110, 118) are made of any of the following electrically insulating materials: mica, silicon, silicon with $Al_2O_3$, SiN, Sapphire or alternate oxide or nitride coating, Yttrium Stabilized Zirconia (YSZ), Zirconia, metal layer and/or with dielectric insulator/barrier such as Ni, Ti, Al, Cu, SiN, organic material, rubber or multiple thin metal and/or dielectric barrier layers, alumina, and a polymer material. In preferred embodiments, the substrate 110 has as substrate thickness of about 5 to 50 microns. The substrates 110 (lower) and 118 (upper) provide structure and containment for the battery 150 while providing an electrically insulating material that prevents electrical shorting of the battery components (115, 116, 140, 135, 136, etc.) The substrates (110, 118) are barriers to materials from the outside environment and do not react with the materials in the internals of the battery 150, e.g. lithium ions.

In preferred embodiments, the cathode current carrying distribution layer or cathode electrode 116 (anode current carrying distribution layer or anode electrode 136) is physically, mechanically and electrically connected to the cathode 115 (anode 135) and the cathode seal 125C (anode seal 125A) through the respective via 100C (100A.) The cathode 116 and anode 136 current carrying distribution layers are made of any one or more of the following: platinum, titanium, copper, gold, palladium, carbon, or alternate compatible conductor, and preferably are between about 0.05 um and 2 microns thick. The current carrying distribution layers (116, 136) are deposited by any known method of depositing metallic layers on substrates 105.

In preferred embodiments, the cathode 115 is made of one or more of the following materials: thin crystalline LiCoO2 or alternate composition cathode and deposited by vacuum deposition or an alternate method. In preferred embodiments the cathode is between 5 and 40 microns in thickness. The cathode 115 is electrically, physically, and chemically connected to the cathode current carrying distribution layer 116 above and the electrolyte layer 140 below.

In preferred embodiments, the electrolyte layer 140 is made of one or more of the following materials: LiPON or solid state electrylyte, $LiP_xO_yN_z$ solid state electrolyte or alternate composition deposited by vacuum deposition or an alternate method. In preferred embodiments the electrolyte layer 140 is between 0.5 and 3 µm in thickness. The electrolyte layer 140 is electrically, physically, and chemically connected to the cathode 115 above and the anode 135 below.

In preferred embodiments, the anode 135 is made of one or more of the following materials: Li metal or alternate material that contains lithium. The anode 135 is deposited by one or more of the following preferred methods: vacuum deposition or alternate method. In preferred embodiments the anode 135 is between 2 and 20 microns in thickness. The anode 135 is electrically, physically, and chemically connected to the electrolyte layer 140 above.

In a preferred embodiment, and enclosure material 160 fills the volume between the upper 118 and lower 110 substrates and surrounds the internal battery components, e.g. the cathode 115, electrolyte 140, anode 135, and current distribution layers (116, 136.) The enclosure material 160 provides physical strength for the battery 150, protects the battery internals from materials from the external environment, and helps prevents leakage of the materials out of the battery 150.

Figure 2A:
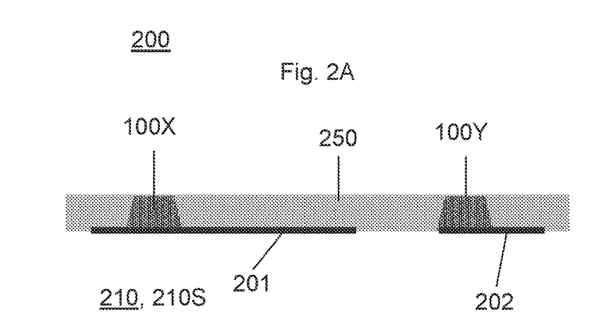
FIG. 2A shows a step in one preferred sealing process ready to implant a seed layer on and around the top of the via in a substrate structure.

FIG. 2A shows a first step 210S in one preferred sealing process 200 (shown in FIGS. 2A to 2D) and a structure 210. The structure 210 has a substrate 250 (like substrate 110) with one or more vias 100 (e.g. 100X and 100Y) containing conductive material 102 with current collectors (201 and 202, respectively) connected to the battery via opening 102B on the battery side 110B of the substrate 250.

Figure 2B:
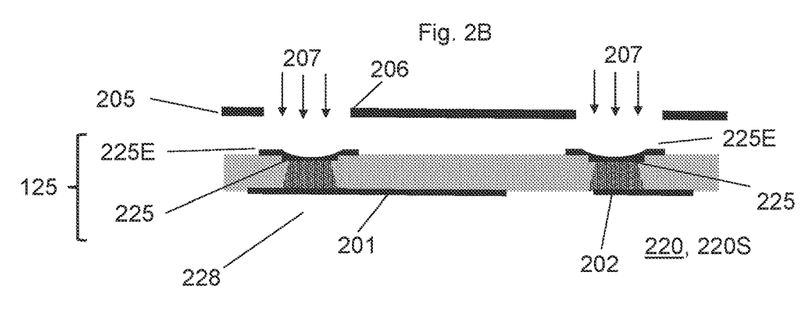
FIG. 2B shows a step in one preferred sealing process where there is a seed layer implanted on and around the top of the via in a substrate structure through a shadow mask.

In FIG. 2B, step 220S places a shadow mask 205 over the structure 220. The shadow mask 205 has an opening 206 over each of one or more vias (100X, 100Y) external via opening 102E. Implant material is irradiated 207 onto the top of the metallic composition 102 in the vias (100X, 100Y) on the external via openings 102E and, in a preferred embodiment, onto the substrate 250 surface 111 surrounding the via openings 101. The amount of substrate surface irradiated (and later the amount of overlap 825L of the seal on the substrate surface) is determined by the size and location of the shadow mask opening 206 with respect to the via (100X, 100Y) being irradiated.

The substrate 250 can be of the same type of material as the substrate 110 described in FIG. 1B.

While the vias (100X, 100Y) go through the substrate 250 and fully contain a conductive metal material 102, in some embodiments the top of the conductive metal does not extend to the surface 111 of the substrate 250.

A conductive layer 201 (e.g. 116) covers the bottom of via 100X and is electrically connected to the metallic material 102 contained in the via 100X on the battery side of the via opening 102B. A conductive layer 202 (e.g. 136) covers the bottom of the via 100Y, the via opening on the battery side 102B and is electrically connected to the metallic material contained in the via 100Y.

The implantation material that is irradiated 207 through the shadow mask 205 creates a seed layer 225 on the top surface of the conductive metal 102 in the vias 100, the external via opening 102E. If the shadow mask opening 206 is large enough, there is also a seed layer 225E created on the substrate (110, 250) surface 111 surrounding the via 100 opening 101.

The seed layer 125 can be made using any material that physically, electrically, and chemically connects to the metallic material 102 in the via (100X, 100Y) and optionally physically and chemically connects to the overlapped substrate surface 111. The seed layer can be any of the following materials: Titanium (Ti), Titanium copper (TiCu), TiCuNi, Ti/Cu/Pt, Ti/Pt, TiCyNiAu, Ta/TaN, Ti/W, or TiN. In preferred embodiments, the seed layer 125 is a stack of layers. For example, the seed layer (125, 225) could be a layer of titanium (Ti) about 300 angstroms thick covered by a layer of copper (cu) 2000 angstroms thick.

The seed layer (225, 225E) can be applied by any of the following vacuum deposition methods, sputtering, CVD, ALD, PECVD, and PVD.

In preferred embodiments, the seed layer 125 (including 225, 225E) is less than 1 micron thick. In other preferred embodiments, the seed layer is between 1 to 5 microns thick.

In some preferred embodiments, a conductive layer 228 covers the bottom of the substrate 250 and the current collectors (201, 202.) This layer 228 can be used as a handler, a contact to electrically check the conductivity of the via 100 and seal 125, and/or as a general protective layer. The layer 228 can be made from any one of the following materials: conductive tape or conductive film.

Figure 2C:
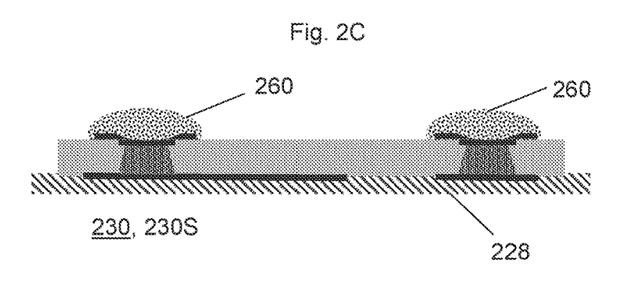
FIG. 2C shows a step in one preferred sealing process where a final conductive seal (cap or plug) is deposited on and around the top of the vias with the substrate attached to a handler.

The seed layer 125 (including 225, 225E) in combination with the cap 260 creates a hermetic seal 125 of the external via opening 102E that prevents gas and moisture from entering and leaving through the via 100.

FIG. 2C shows a step 230S in a preferred sealing process 200 where the shadow mask 205 is removed, the implanting radiation 207 terminated, and one or more caps 260 are disposed on the seeded regions (225, 225E) of structure 230. The caps 260 comprise any one or more of the following materials: an electroplated metal layer, a solder, a solder ball, a solder connection deposited by Injection Molded Solder (IMS), a solder connection deposited by IMS using a mold, a solder connection deposited by stencil printing using a mold, Sn, Sn—Cu, Sn—Ag, SnCuAg, In, SnIn, SnBi, and SnBiIn. The caps 260 are deposited by any one or more of the following methods: ball drop and reflow, IMS (see description of FIG. 4 below.)

Figure 2D:
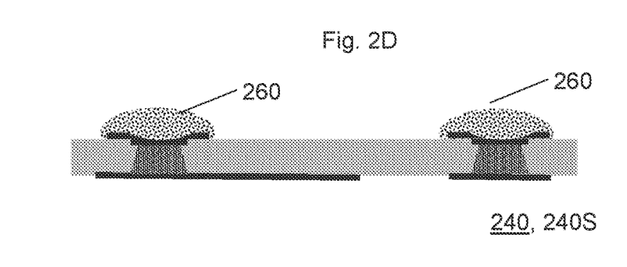
FIG. 2D shows a step in one preferred sealing process where the handler is removed showing a resulting structure with the final seals and caps.

FIG. 2D shows a step 240S in a preferred sealing process 200 where the handler 228 is removed showing a resulting structure 240. In this sealing process 200 there was no step performed that added additional material on the seal layer (225, 225E) before the final seal (125, 260) was deposited.

In some preferred embodiments of this process 200 the seal 125 can be thin, e.g. on the order of less than 1 micron thick and is created solely by the implanted 207 material.

Figure 3A:
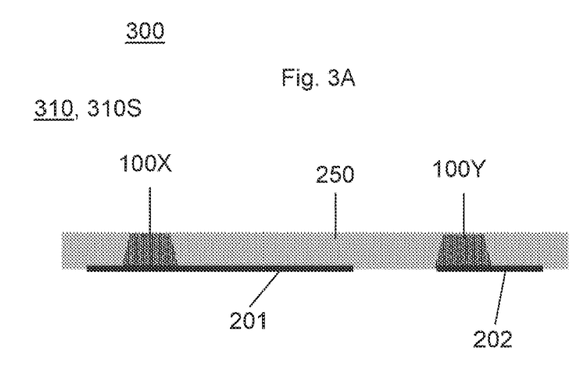
FIG. 3A shows a step in an alternative preferred sealing process that starts with vias filled with conductive material that pass through a substrate.

FIG. 3A shows a step 3105 in an alternative preferred sealing process 300 that starts with vias (100X, 100Y) filled with conductive material that pass through a substrate.

Figure 3B:
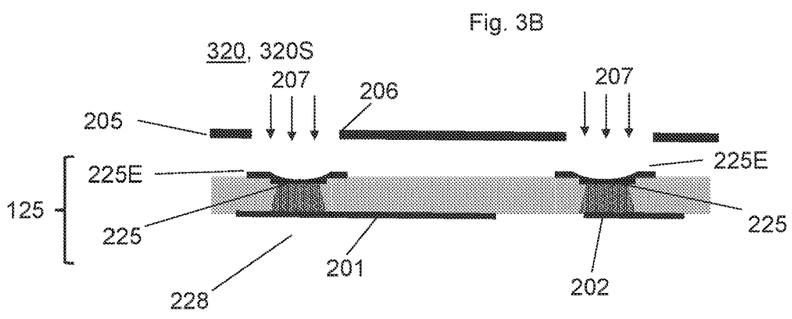
FIG. 3B shows a step in an alternative preferred sealing process implanting a seed layer on and around the top of the vias through a shadow mask.

FIG. 3B shows a step 320S in a preferred wet sealing process 300 that implants a seed layer (225, 225E) through a shadow mask 205 on the vias (100X, 100Y) and on the substrate 250 surface 111 surrounding the top of the vias (100X, 100Y) in structure 320.

In this step 320S, implanted material is irradiated through holes 206 in the shadow mask 205. The size, shape, and location of the holes 206 in the shadow mask 205 and the positioning of the mask 205 determine size, shape, and location of the area of the vias (100X, 100Y) and the substrate 250 surface 111 that are implanted 207 and the area of overlap 825L of implantation 225E on the substrate 250 surface 111 that surrounds the via (100X, 100Y) opening.

Figure 3C:
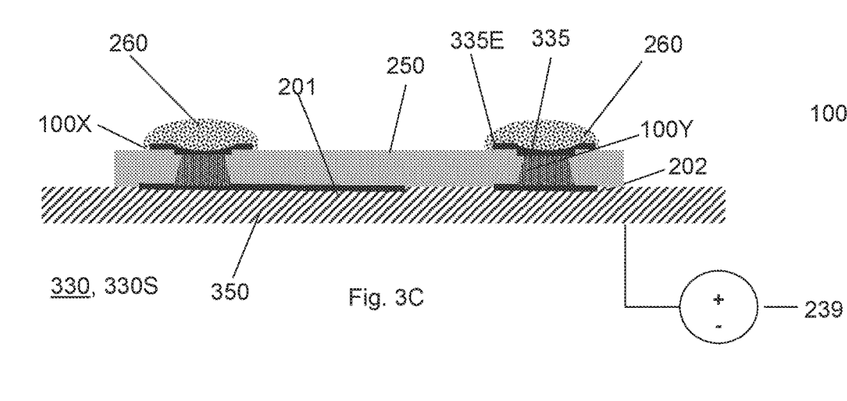
FIG. 3C shows an optional step in one preferred sealing process that deposits a final conductive seal (cap or plug) on and around the top of the vias with the substrate attached to a handler after an optional electroplated layer is added.

FIG. 3C shows a step 330S in one preferred sealing process 300 that deposits a final conductive seal (cap or plug) on and around the top of the vias on an optional electroplated layer (335, 335E) with the substrate 250 attached to a conductive handler 350.

The shadow mask 205 and irradiation 207 have been removed. In a preferred embodiment, the seed layer 125 (including 225 and 225E) in this step is thin, less than 1 micron thick but can be on the order of 1 to 5 microns thick.

FIG. 3C shows an optional step 330S in one preferred sealing process 300 that deposits, e.g. by electroplating, a thicker conductive layer on 335 and around the top 335E of the via 100. The thicker conductive layer (335, 335E) is deposited on the seed layer 125. The thicker conductive layer (335, 335E) can be thick enough to be an electroplated cap 260 in alternative embodiments.

The structure 330 is developed by physically and electrically connecting a conductive plate 350 to the bottom of the substrate 250 and the conductive layers 201 and 202. The conductive plate 350 can also act as a handler to provide structure stability to the substrate 250. Further, the conductive plate 350 protects the bottom of the substrate 250 and the current collectors (201, 202) from contamination from the wet electrochemical processes that follow.

An electrical potential 239 can be connected to the conductive plate 350 to provide an electrical potential on the seed layer 125 while placing the structure 330 in a plating bath to apply a thicker conductive layer (335, 335E) on the seed layer 125.

Alternative methods can be used to deposit the thicker conductive layer (335, 335E) on the seed layer 125 including solder paste printing and reflow.

Figure 3D:
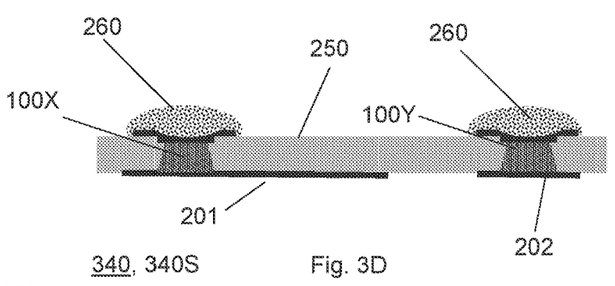
FIG. 3D shows a step in one preferred sealing process where the handler is removed.

FIG. 3D shows a step 340S in one preferred wet sealing process 300 where a final conductive cap or plug 260 deposited on and around the top of the seed layer 125 and/or the thicker conductive layer (335, 335E) results in structure 340. As before, the cap/plug 260 can be deposited by any of the following methods: ball dropping, solder paste printing, reflowing a solder ball, and injection molding, etc.

The seal 125 is physically, chemically, and electrically connected to the metallic material 102 at the via 100 surface 225 (external via opening 102E) and physically and chemically connected to the seeded region (225, 325E) of the substrate 250 surface 111 surrounding the top of the via 100.

The seal 125 hermetically seals the vias 100 and battery 150 from exterior environmental factors like moisture and gases that would react with the battery 150 internals if they passed through the porous metallic material 102 in the vias 100. Depositing the cap 260 on the seal 125 (and the additional thicker conductive layer 335, 335E) improves and protects the seal 125 and permits electrical contact to the battery 150.

Figure 4:
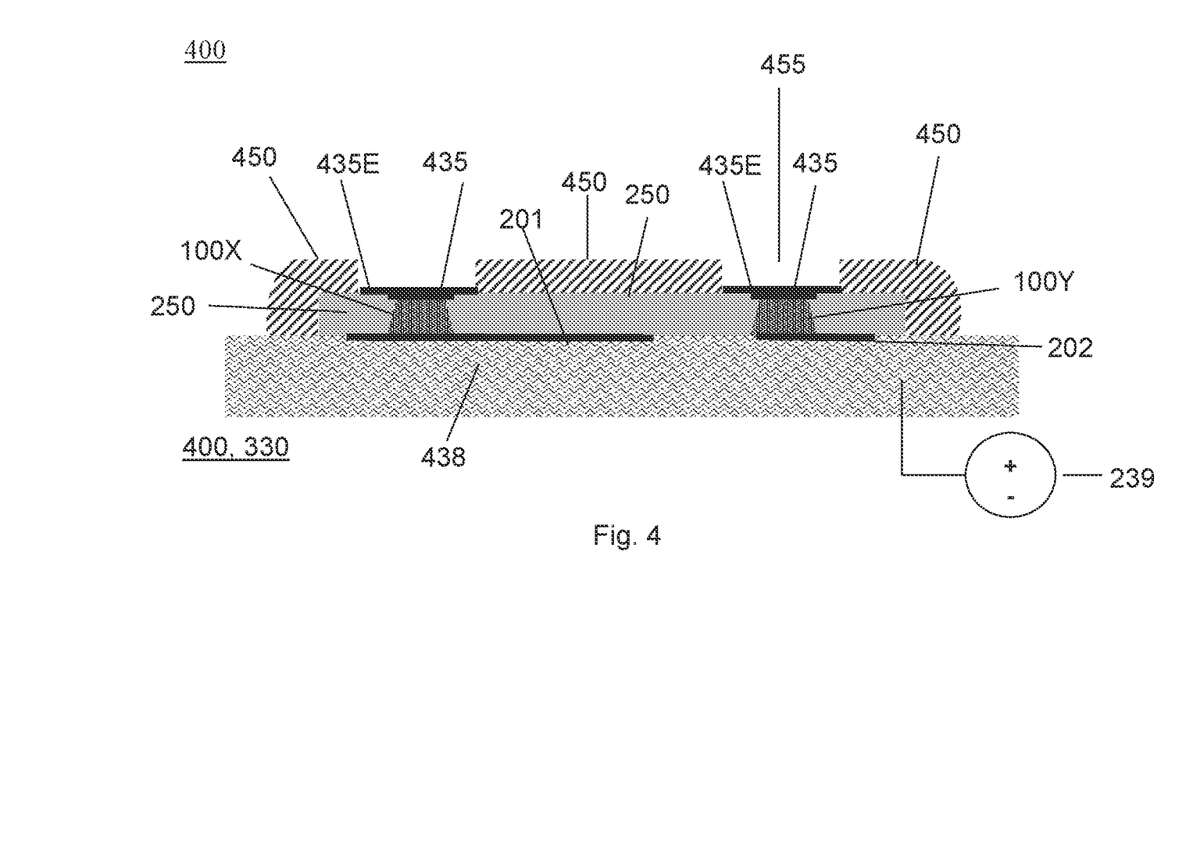
FIG. 4 shows a structure used in an alternative electroplating process with a dry film photoresist over the substrate.

FIG. 4 shows an alternative embodiment of a structure 400 used in an electroplating process e.g., as a non-limiting example of step 330S. Structure 400 is similar to structure 330. Example vias 100X and 100Y pass through substrate 250 and are filled with conductive material 102. Current collectors 201 and 202 are connected to material 102 in the vias 100X and 100Y, respectively, on the battery side 110B. A conductive plate 438 is attached to the bottom of the substrate 250 and is electrically connected to the current collectors 201 and 202 and through the conductive material 102 in the vias 100X and 100Y to the seed layers 125. By applying electrical potential 239 to the conductive plate 438 while the structure 400 is immersed in an electroplating solution, additional material 435 and 435E is deposited on the seed layer 125 on the via 100 and on the substrate 250 surface 111 surrounding 435E the via 100 opening 111.

The conductive plate 438 can be made of any conductive material including: Cu, stainless steel, Ti, etc.

A preferred thickness of the conductive plate 438 is between 100 um and 500 um.

In a preferred embodiment, layer 450 is deposited on the substrate 250. Layer 450 protects the top of the substrate 250 from being contaminated by the electroplating solution. Further, layer 450 has openings 455 that precisely locate the areas where additional material (435, 435E) is plated. This feature enables placement of plated conductor exactly over the via 100 and seed layer 125 with a precise amount of overlap 825L over the substrate 250 surface 111.

FIGS. 5A through 5D disclose a completely dry process 500 and is one preferred embodiment for sealing a via 100.

Figure 5A:
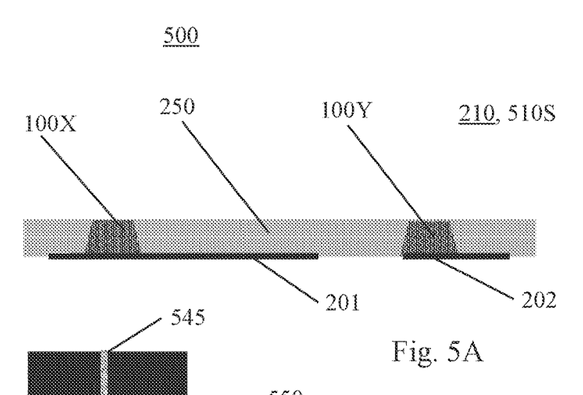
FIG. 5A is a step in one preferred dry cap/plug deposition sealing process showing a substrate with two vias filled with conductive material.

FIG. 5A shows a step 510S in an alternative preferred dry sealing process 500 that starts with a structure 210 with vias (100X, 100Y) filled with conductive material 102 and where the vias pass through a substrate 250. A conductive layer 201 covers the bottom of via 100X and is electrically connected to the metallic material 102 contained in the via 100X. A conductive layer 202 covers the bottom of via 100Y and is electrically connected to the metallic material 102 contained in the via 100Y.

Figure 5B:
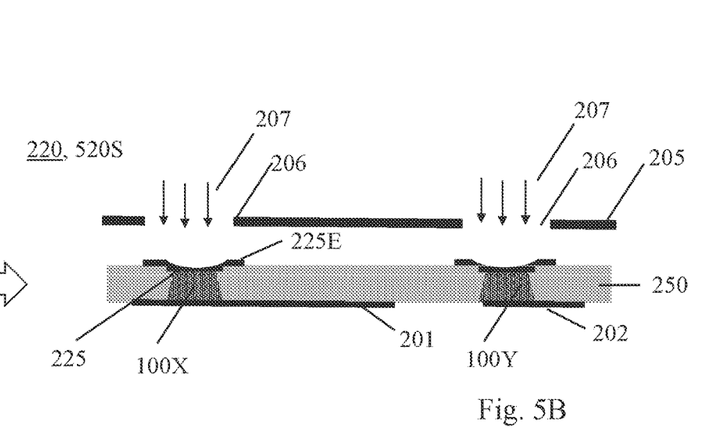
FIG. 5B is a step in one preferred dry cap/plug deposition sealing process showing the vias and surrounding surface of the substrate being irradiated through a mask to create a seed layer.

FIG. 5B shows a step 520S in an alternative preferred dry sealing process 500 that implants a seed layer 125 (including 225 and 225E) on 225 the vias (100X, 100Y) and on the top surface 111 of the substrate 250 around 225E the top of the vias (100X, 100Y) on structure 220.

In this preferred embodiment, implanted material is irradiated 207 through a shadow mask 205 through holes 206 through the shadow mask 205. The size, shape, and location of the holes 206 in the shadow mask 205 and the positioning of the mask 205 determine size, shape, and location of the area of the vias (100X, 100Y) and the surface of the substrate 250 that are implanted 207 and the area of overlap 825L of implantation 107 on the surface of the substrate 250 on 225 and surrounding 225E the via (100X, 100Y) opening.

In a preferred embodiment, the seed layer 125 is less than 1 micron thick. However, in other embodiments, the seed layer 125 can be between 1 to 5 microns thick or thicker, depending on the application. Materials implanted in the seed layer 125 include any one or more of the following: Titanium (Ti), Titanium copper (Ti/Cu), Ti/Cu/Ni, TilCu/Pt, Ti/Pt, Ti/Pd, Ti/Cu/Pd, Ta/TaN, Ti/W, or Ti/TiN, etc.

Figure 5C:
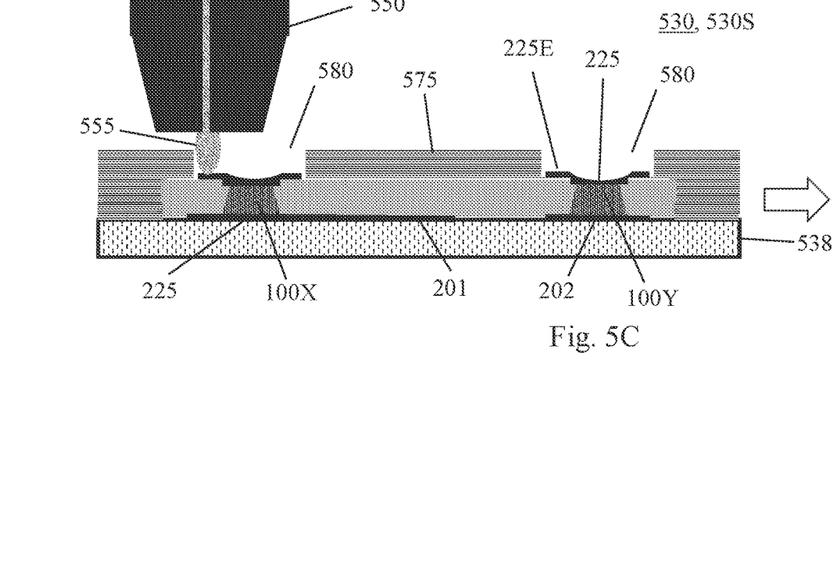
FIG. 5C is a step in one preferred dry cap/plug deposition sealing process showing the substrate being attached to a handler and a cap/plug deposited on the seed layer using an Injection Molded Solder (IMS) process with a solder mask.

FIG. 5C shows step 530S of process 500. In step 530S a handler 538 is attached to the bottom of the substrate 250 to provide physical strength to the structure 530 and facilitate easier handling of the structure 530. The handler 538 also protects the bottom of the substrate 250 and the current collectors 201 and 202 during the process 500.

A mold 575 is also disposed on top of the substrate 250) with mold openings 580 that allows metallic material, e.g. solder, to be positioned and shaped within the mold openings 580. The mold may be a thy-film photoresist or a pre-cut high temperature film, etc.

A fill head 550, known in the art, has a metal, e.g. solder, supply 545 and is positioned over each of one or more of the openings 580 to deposit 555 the metal into the mold openings 580 on the seed layer 125 (comprising 225 and 225E.) Using this method 500, the caps/plugs 260 can be accurately positioned and formed.

The injection solder method using the mold 575 helps avoid contamination issues from any later steps in the process, e.g. an electroplating solution.

Figure 5D:
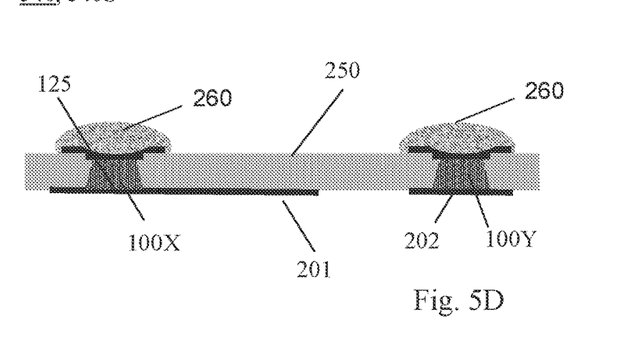
FIG. 5D is a step in one preferred dry cap/plug deposition sealing process showing the substrate with the caps/plugs deposited on the seed layer with the solder mask and handler removed.

FIG. 5D shows a step 540S in an alternative preferred sealing process 500 where the handler 538 is removed showing a resulting structure 540. In this sealing process 500 there was no step performed that added additional material on the seal layer 125 before the final cap/plug 260 was deposited but this additional step is optional.

The fill head 550 makes injection soldering deposits of molten solder 555 with local vacuum onto the seed layer (225, 225E), which foul's a defect-free coverage 260 over and around a via. The deposition process 530S is dry and less likely to trap any moisture or chemical contaminants in the via 100.

Figure 6A:
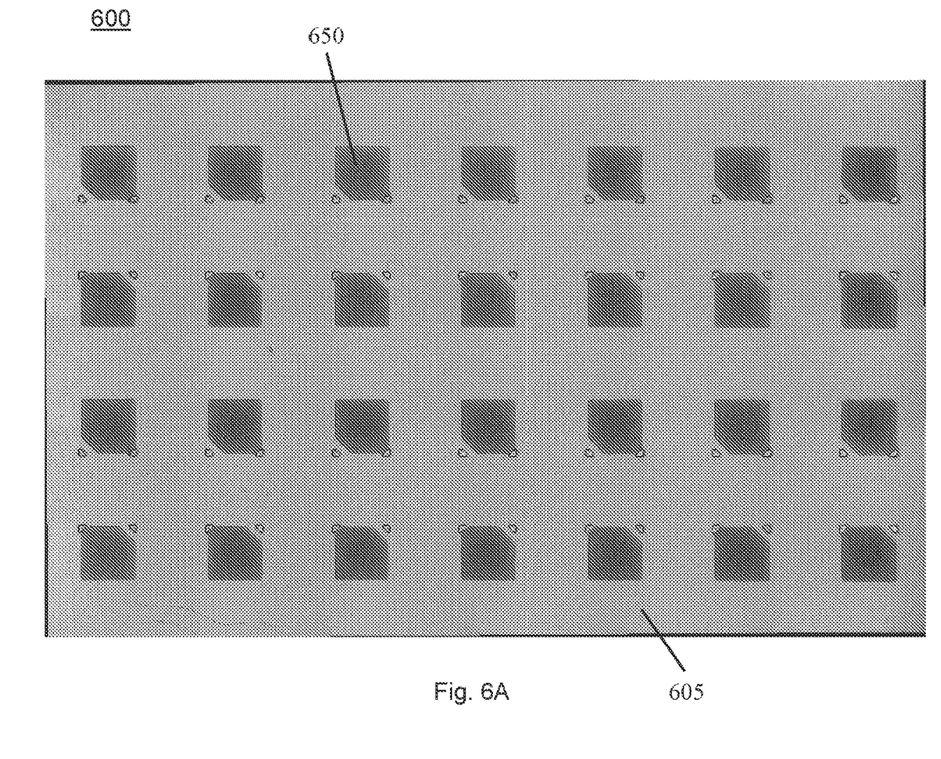
FIG. 6A shows an array of batteries produced by one or more methods in this disclosure.

FIG. 6A shows an array of batteries 600 produced by one or more methods in this disclosure.

Arrays 600 of batteries 650 hermetically sealed 125 as shown in FIG. 6A and can be made by any of the methods disclosed herein. For example, process 200 can make an array 600 by scaling up the size of the shadow mask 205. Step 330S of process 300 can make an array 600 by scaling up the shadow mask and conductive plate 350, as well as the plating bath so the plating is done on all sealed layers 125 at once. Process 500 can create an array 600 by scaling the shadow mask 205 step 520S and increasing the positioning range of the fill head 550.

Figure 6B:
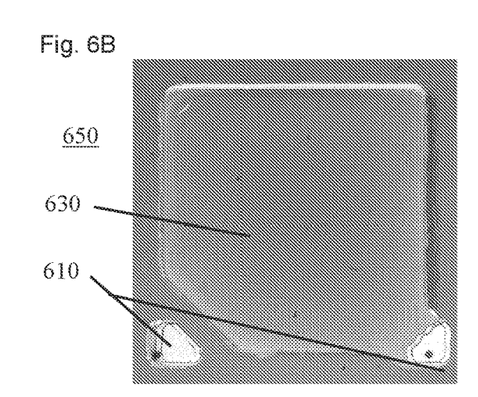
FIG. 6B shows one preferred embodiment of a battery with seed layers covering the via openings.

FIG. 6B shows one preferred embodiment of a battery 650 with seed layers covering the via openings (not shown) and battery internals encased 630. In this non-limiting embodiment, a plated surface (335, 335E) is made of Ni/Au 610 and is deposited over the seed layer.

Figure 6C:
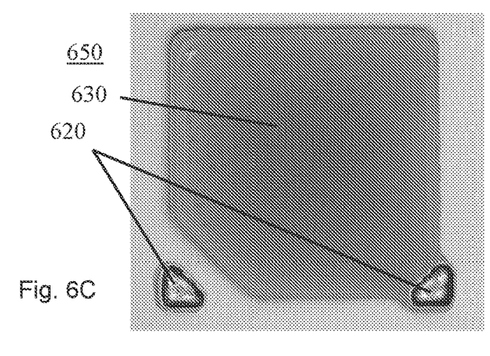
FIG. 6C shows one preferred embodiment of a battery with cap/plug, connections attached to the seed layers.

FIG. 6C shows one preferred embodiment of the battery 650 shown in FIG. 6B with cap/plug 260 connections attached to the plated surfaces (335, 335E.) The cap/plug 260 is made from SnCu solder 620.

Figure 7:
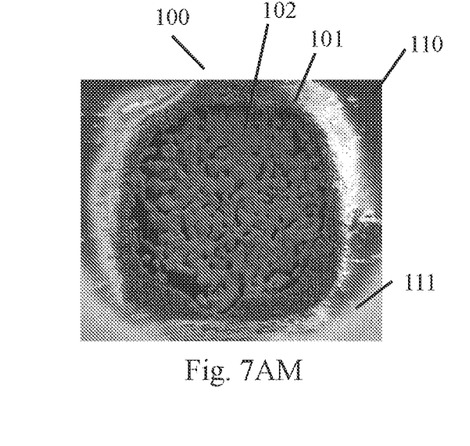
Figure 7A:
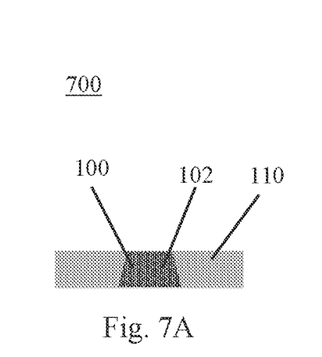
FIG. 7A is a diagram of a via with conductive material filling the via with no seal.

FIG. 7A is a diagram of a via 100 through a substrate 110 with porous conductive material 102 filling the via 100 with no seal 125.

FIG. 7AM is a micrograph of the via 100 in FIG. 7A. The via opening 101, substrate 110, porous conductive material 102 filling the via, and substrate surface 111 are shown.

Figure 7B:
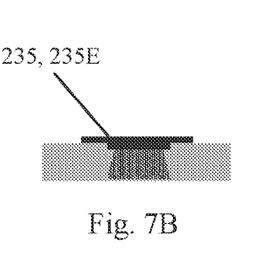
FIG. 7B is a diagram of a via with a seed layer over conductive material filling the via and a thicker conductive layer overlapping the top of the substrate.

FIG. 7B is a diagram of a via 100 with addition material, e.g. a plated layer (335, 335E) over conductive material 102 filling the via 100 and the plated layer (335, 335E) overlapping 825L the top of the substrate 111.

Figure 7C:
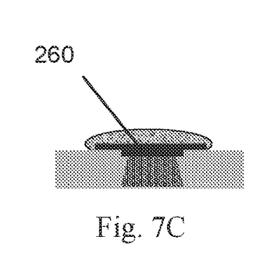
FIG. 7C is a diagram of a cap plug covering the seed layer/thicker conductive layer over the via and overlapping over the top of the substrate.

FIG. 7BM is a micrograph of the via in FIG. 7C.

FIG. 7C is a diagram of a cap/plug 260 of solder covering the plated layer (335, 335E) over the via opening 101 and overlapping 825L over the top of the substrate.

FIG. 7CM is a micrograph of the via 100 in FIG. 7C.

Figures 8, 8A:
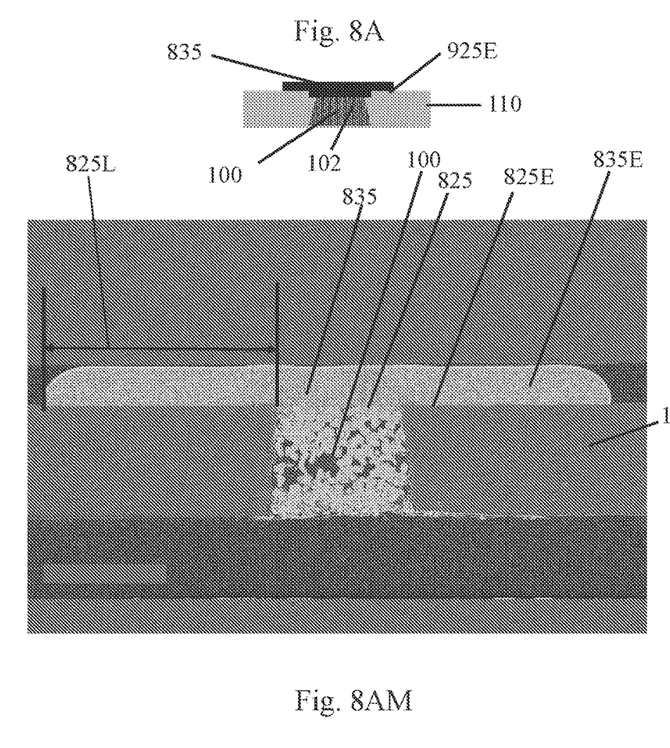
FIG. 8A is a diagram of an electroplated cap overlapping the via opening.

FIG. SA is a diagram of a via 100 filled with a porous conductive material 102 passing through a substrate 110 and an electroplated cap overlapping the via opening.

FIG. SAM is a micrograph of the cap in FIG. 8A. The micrograph shows a via 100 filled with porous conductive material 102 passing through the substrate 110. There is a seed layer over the via 825 and a seed layer extends 825E beyond the via opening covering the substrate surface. The seed layers (825, 825E) are difficult to see on the micrograph because they are under 5 μm thick. There is a cap (835, 835E) plated over the via 100 and extended over the substrate surface 835E. The plated cap (835, 835E) is made by one of the electroplating methods described above and has a thickness of 10 to 50 μm.

The plated cap also extends to overlay the substrate 110 surface 111 an overlay distance 825L. In a preferred embodiment, the overlay distance 825L is between 50% to 3 times the via diameter.

Figure 8B:
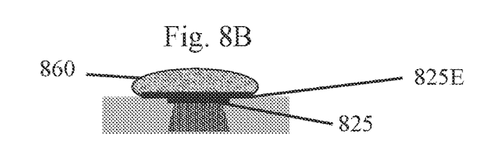
FIG. 8B is a diagram of a deposited cap overlapping the via opening.

FIG. 8B is a diagram of a deposited solder cap 860 deposited on a seed layer (825, 825E) covering 825 the via 100 and overlapping 825E the substrate surface. In this embodiment, there is no electroplated material so the entire process can be "dry" without risk of contaminating the via 100, substrate 110 or other battery components with material from an electroplating bath.

FIG. 8BM is a micrograph of the structure shown in FIG. 8B. The vias 100 filled with porous conductive material 102 passing through the substrate 110. A seed layer 825 covers the top of the via 100. There is also a seed layer 825E on the substrate surface surrounding the via opening. The deposited solder cap 860 is not flat but rather a dome structure with a peak height of about 80 μm and a base of about 240 μm or more. In a preferred embodiment, the cap thickness is between 5 to 50 μm. As shown, this solder cap 860 is not precisely centered over the via 100. However, if the cap 860 was deposited with a method like 500 using a solder mask 575, a more accurate placement of the cap 860 can be achieved. In alternative embodiments, the solder cap 860 can be made of one or more of the following: an electroplated solder bump, a solder ball deposited by Injection Molded Solder (IMS), or by stencil printing using a mold, Sn, Sn—Cu, Sn—Ag, SnCuAg, In, SnIn SnBi, and SnBiIn.

Figure 9A:
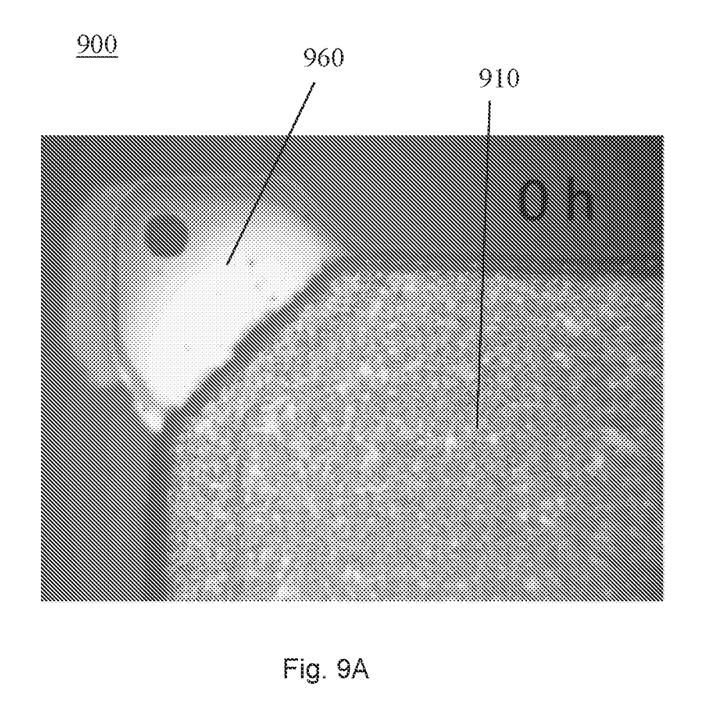
FIG. 9A is a micrograph of a hermetically sealed via structure before exposure to external heat, moisture and gases.

FIG. 9A is a micrograph 900 of a hermetically sealed via structure in a battery 910 before exposure to external heat, moisture and gases in a test to determine the effectiveness of the seal 125 and other structures of this invention.

Lithium metal and other battery internals are highly reactive. If the battery 910 vias 100 are not sealed, a lithium battery cell can only last a few hours in an accelerated humidity storage test with 80% relative humidity at 65° C. since the lithium metal anode quickly reacts with O2, N2 and/or H2O.

In this test, a battery 910 with connection 960 with sealed 125 vertical vias 100 (not shown) has been subjected to an accelerated humidity storage test with 80% relative humidity at 65° C.

Figure 9B:
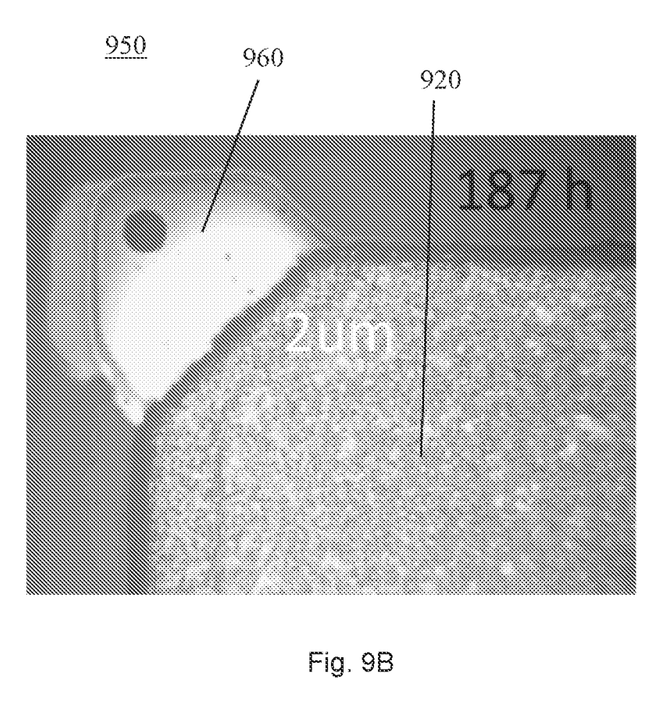
FIG. 9B is a micrograph of a hermetically sealed via structure after exposure to external heat, moisture and gases simulating more than one year of shelf life for the structure.

FIG. 9B is a micrograph of a hermetically sealed via structure after exposure to the above external heat, moisture and gases simulating nearly one year of shelf life for the structure. After 187 hours, only 2 μm of reacted lithium has been observed, which is the equivalent to a storage life in air for more than one year approximately. Therefore, an effective hermetical sealing has been proven.

Figure 10:
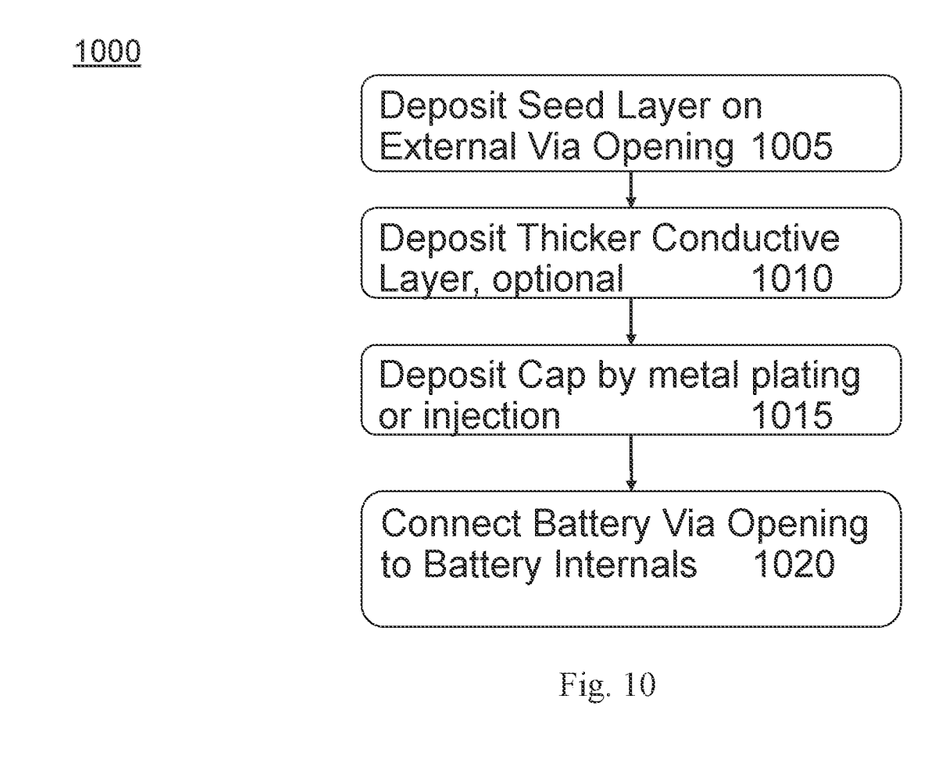
FIG. 10 is a flow chart showing the steps of one preferred method of making a battery with vertical vias each with a sealed via opening.

FIG. 10 is a flow chart showing the steps of one preferred method 1000 of making a lithium battery 150 with a vertical vias, each with a sealed via opening.

Step 1005 of the method 1005 begins with depositing a seed layer on an external via opening of a porous electrically conductive material 102 filling one or more vias 100 passing through a substrate 110. The external via opening 102E is the via opening 101 exposing the porous conductive material 102 on the external side 110E of the substrate 110.

The seed layer 125 is deposited 1005 by any one of the alternative steps described above, for example, among other places, steps 220S, 320S, and 520S. The deposition is contemplated both on the external via opening 102E and on the substrate surface surrounding the via.

Step 1010 deposits a thicker conductive layer, optionally, as described in step 330S.

Step 1015 deposits a cap on the seed layer as also described above for example among other places in steps 230S, 330S and 340S, and 530S and descriptions of cap 260 structures.

Step 1020 connects one or more of battery via openings to one or more internal battery components. The battery via opening 102B can be connected to current collectors 116 and 136 as described above. The battery via opening 102B is the porous conductive material 102 on the battery side 110B of the substrate 110.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. An electrical connection to a lithium battery comprising:
 a substrate with a battery side and an external side, the external side having a substrate surface;
 one or more vias passing through the substrate;
 a porous electrically conductive material filling each of the vias, the porous electrically conductive material having an external via opening on the external side and a battery via opening on the battery side, the battery via opening electrically connected to one or more lithium battery components in the lithium battery;
 an electrically conductive seed layer covering the external via opening and penetrating the external via opening a seed layer depth; and
 an electrically conductive cap electrically connected to the seed layer,
wherein the seed layer and electrically conductive cap hermetically seal the porous electrically conductive material from environmental factors.

2. A connection, as in claim 1, where the environment factors include one or more of the following: gases, liquids, nitrogen, oxygen, water, and moisture.

3. A connection, as in claim 1, where the seed layer depth is less than 20 µm.

4. A connection, as in claim 1, where the seed layer further covers a region surrounding the external via opening on the external side surface of the substrate.

5. A connection, as in claim 4, where the region surrounding the external via opening overlaps the external side surface of the substrate an overlap distance equal to at least 50% the diameter of the via.

6. A connection, as in claim 1, where the seed layer comprises any one or more vacuum deposited materials within the seed layer depth of the external via opening as follows: Titanium (Ti), Ti/Cu, Ti/Cu/Pt, Ti/Pt, Ti/Pd Ti/Cu/Pd Ta/TaN, Ti/W, and Ti/TiN.

7. A connection, as in claim 6, where the injected materials are injected into the external via opening by any one of the following: a vacuum deposition method, sputtering, atomic layer deposition (ALD,) evaporation, Chemical Vapor Deposition (CVD,) Plasma Enhanced Chemical Vapor Deposition (PECVD,) Physical Vapor Deposition (PVD,) a wet deposition, a dry deposition, a radiation with a shadow mask, and lithography.

8. A connection, as in claim 1, further comprising a thicker conductive layer between the seed layer and the cap.

9. A connection, as in claim 8, where the thicker conductive layer is an electroplated layer with a plated thickness of below 5 µm.

10. A connection, as in claim 1, where the cap is one or more of the following: a cap electroplated metal, a dropped solder ball, solder disposed by Injection Molded Solder (IMS,) and stencil printed solder paste.

11. A lithium battery comprising:
 a cathode made of a first lithium compound, the cathode connected to a cathode current collector;
 an anode made of a second lithium compound, the anode connected to an anode current collector;
 an electrolyte between the cathode and anode;
 a substrate with a battery side and an external side, the external side having a substrate surface;
 a cathode via passing through and perpendicular to the substrate;
 an anode via passing through and perpendicular to the substrate;
 a porous electrically conductive material filling each of the anode and cathode vias, the porous electrically conductive material in each via having an external via opening on the external side and a battery via opening on the battery side, the battery via opening of the anode via electrically connected to the anode and the battery via opening of the cathode via electrically connected to the cathode;
 a cathode electrically conductive seed layer covering the external via opening of the cathode via and penetrating the external via opening of the cathode via a cathode seed layer depth;
 an anode electrically conductive seed layer covering the external via opening of the anode via and penetrating the external via opening of the anode via an anode seed layer depth;
 an electrically conductive cap electrically connected to each of the cathode seed layer and the anode seed layer,
wherein the seed layer in combination with the electrically conductive cap hermetically seal the porous electrically conductive material from environmental factors.

12. A battery, as in claim 11, further comprising a thicker conductive layer between the seed layer and the cap.

13. A battery, as in claim 11, where the cap comprises any of following materials: an electroplated metal layer, a solder, a solder ball, a solder connection deposited by Injection Molded Solder (IMS), a solder connection deposited by stencil printing using a mold, Sn, Sn—Cu, Sn—Ag, SnCuAg, In, SnIn SnBi, and SnBiIn.

14. A battery, as in claim 11, where the substrate comprises one or more of the following materials: mica, silicon, silicon with $Al_2O_3$, SiN, sapphire coating, oxide coating, nitride coating, Yttrium Stabilized Zirconia (YSZ), Zirconia, metal layer, dielectric insulator, organic material, rubber, multiple thin metal layers, dielectric barrier layers, alumina, ceramic, and a polymer material.

15. A battery, as in claim 11, where the porous electrically conductive material comprises one or more of the following: silver (Ag,) a metal polymer, a metal ceramic, and a conductive composite.

16. A battery, as in claim 11, that is one of the batteries in an array of batteries.

17. A battery, as in claim 11, where the environmental factors are sealed from the cathode, anode, and electrolyte while the battery undergoes conditions of at least 80% relative humidity at 65° C. for 187 hours.

* * * * *